(12) United States Patent
Eriksson

(10) Patent No.: US 7,450,055 B2
(45) Date of Patent: Nov. 11, 2008

(54) COAXIAL CONNECTOR IN RADAR LEVEL GAUGE

(75) Inventor: Mikael Eriksson, Vastervik (SE)

(73) Assignee: Rosemount Tank Radar AB, Gothenburg (SE)

( * ) Notice: Subject to any disclaimer, the term of this patent is extended or adjusted under 35 U.S.C. 154(b) by 38 days.

(21) Appl. No.: 11/359,257

(22) Filed: Feb. 22, 2006

(65) Prior Publication Data

US 2007/0205781 A1 Sep. 6, 2007

(51) Int. Cl.
*G01F 23/284* (2006.01)
*H01R 13/02* (2006.01)

(52) U.S. Cl. ...................................... 342/124
(58) Field of Classification Search ................ 342/124, 342/175; 174/28
See application file for complete search history.

(56) References Cited

U.S. PATENT DOCUMENTS

| | | | | |
|---|---|---|---|---|
| 5,943,908 | A | 8/1999 | Innes et al. .................. 73/290 |
| 6,148,681 | A | 11/2000 | Gravel et al. ............... 73/866.5 |
| 6,178,817 | B1 | 1/2001 | Hewelt et al. ................. 73/290 |
| 6,778,044 | B2 | 8/2004 | Fehrenbach et al. ......... 333/260 |
| 6,950,055 | B2* | 9/2005 | Edvardsson et al. ......... 342/124 |
| 7,106,247 | B2* | 9/2006 | Edvardsson ................. 342/124 |
| 7,173,436 | B2* | 2/2007 | Edvardsson ................. 342/124 |
| 7,233,278 | B2* | 6/2007 | Eriksson ..................... 342/124 |
| 2002/0135508 | A1* | 9/2002 | Kleman ....................... 342/124 |
| 2003/0168674 | A1 | 9/2003 | Muller et al. ................ 257/200 |
| 2005/0083228 | A1* | 4/2005 | Edvardsson ................. 342/124 |
| 2005/0083229 | A1* | 4/2005 | Edvardsson et al. ......... 342/124 |
| 2005/0150568 | A1 | 7/2005 | Dietmeier ..................... 141/95 |
| 2006/0055591 | A1* | 3/2006 | Eriksson ..................... 342/124 |
| 2007/0020998 | A1* | 1/2007 | Edvardsson ................. 439/607 |
| 2007/0101810 | A1* | 5/2007 | Eriksson et al. ........... 73/290 V |
| 2007/0205781 | A1* | 9/2007 | Eriksson ..................... 324/754 |

FOREIGN PATENT DOCUMENTS

WO   WO2007/097690   * 8/2007

* cited by examiner

*Primary Examiner*—Dan Pihulic
(74) *Attorney, Agent, or Firm*—Westman, Champlin & Kelly, P.A.

(57) ABSTRACT

A guided wave radar level gauge for determining a process variable of a product in a tank, a feed through fitting, a probe extending into the tank, transceiver circuitry mounted on a circuit board, a housing having a body portion for accommodating said circuit board, and a neck portion for attachment of said housing to said feed through fitting. A rigid, essentially straight, coaxial connector is arranged in said neck portion. Said connector having a central lead portion without detachable connections, a first end of said lead portion protruding into said body portion, and a second end of said lead potion in electrical contact with said probe when said housing is attached to said feed through fitting. Said circuit board is mounted in direct contact with said first end of said lead portion, so that said connector provides electrical contact between said probe and said transceiver circuitry.

11 Claims, 4 Drawing Sheets

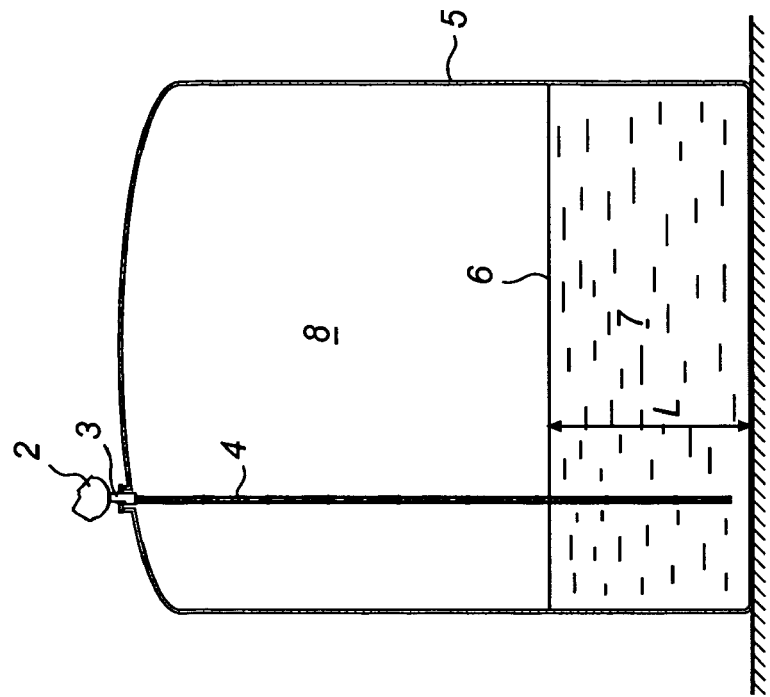
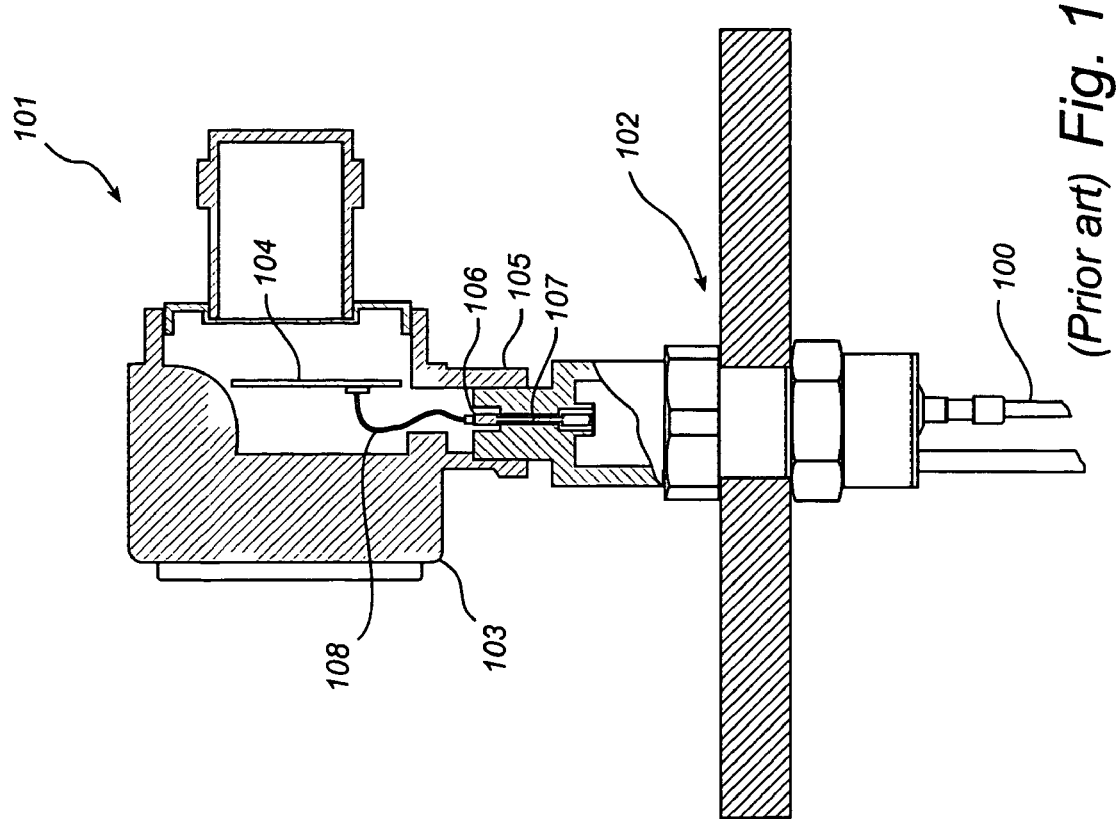
Fig. 2
Fig. 1 (Prior art)

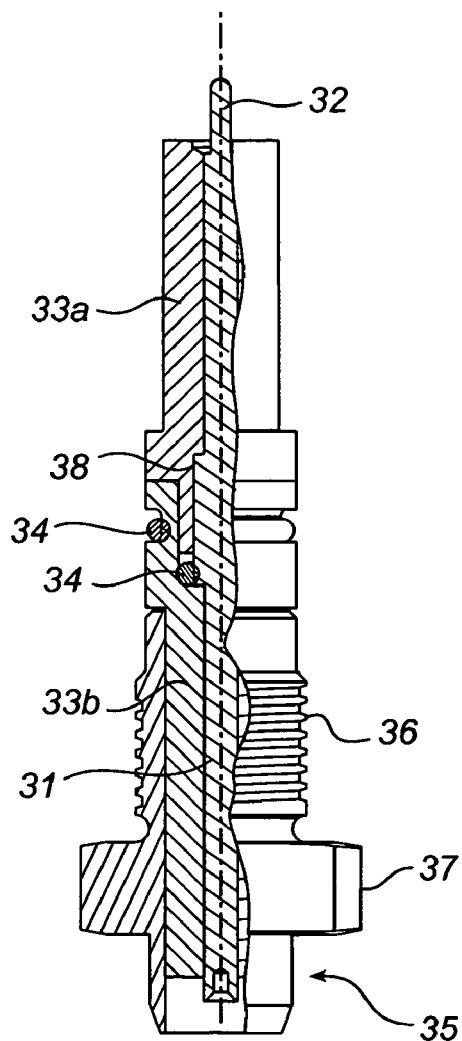
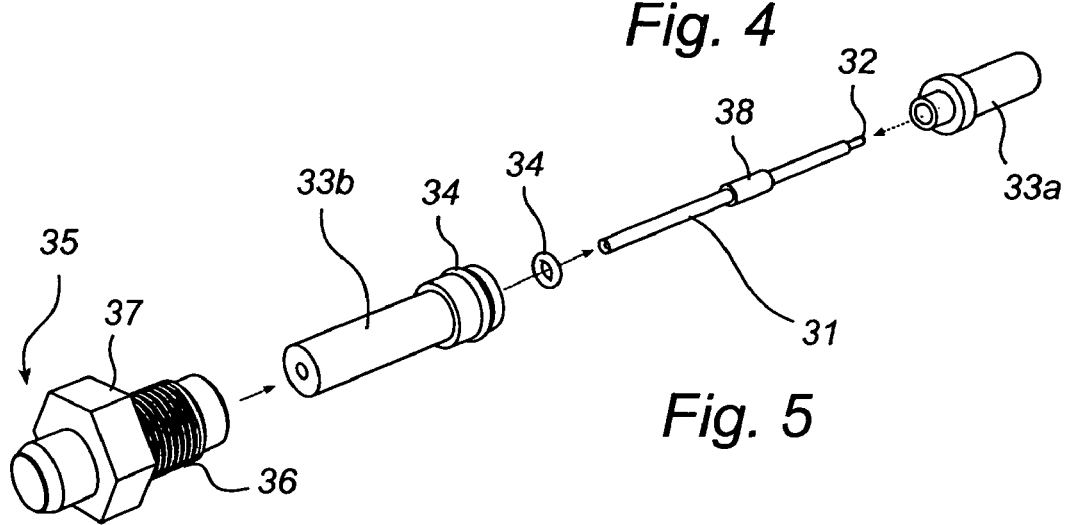
Fig. 4
Fig. 5

COAXIAL CONNECTOR IN RADAR LEVEL GAUGE

FIELD OF THE INVENTION

The present invention relates generally to guided wave radar level gauges, i.e. radar level gauges (RLG) where the emitted waves are guided by a structure, such as a probe extending into a tank. More specifically, the present invention relates to the connection of the guiding structure to the processing circuitry of the RLG.

BACKGROUND OF THE INVENTION

A conventional guided wave RLG is schematically illustrated in FIG. 1. The gauge essentially comprises two parts, a probe 100 extending into the tank, and a gauging unit 101 fixed on top of the probe. The upper end of the probe is attached in a tank connection 102, which is mounted in the ceiling of the tank. The gauging unit has a body portion 103 for housing the processing electronic of the gauge, typically located on one or several circuit boards 104 and a neck portion 105 for attaching the gauging unit to the tank connection 102.

In order to connect the processing electronics to the probe 100, a coaxial connector 107 provided with a coaxial terminal 106 is arranged in the neck portion 105, and adapted to be brought into electrical contact with the probe 100 when the housing is mounted. A coaxial cable 108 is then connected from the terminal 106 to a corresponding terminal on the circuit board 104.

An example of such a guided wave RLG is disclosed in U.S. Pat. No. 6,778,044.

A disadvantage with this solution is that the coaxial cable connections are relatively expensive and bulky.

GENERAL DISCLOSURE OF THE INVENTION

It is therefore an object of the present invention to mitigate these problems, and to provide an improved connection between the probe and the processing circuitry in a guided wave radar level gauge.

According to one aspect of the present invention, this is accomplished by a guided wave radar level gauge comprising a feed through fitting, adapted to be securely attached in the ceiling of the tank, a probe, having a first end fixedly arranged in said fitting and a second end extending into the tank, transceiver circuitry mounted on a circuit board, said transceiver circuitry being arranged to generate an electromagnetic signal to be guided by the probe into the tank, and to receive a reflection of said signal guided back from the tank by the probe, processing circuitry connected to said transceiver circuitry and arranged to determine said process variable based on a relationship between said transmitted signal and said reflection, a housing having a body portion for accommodating the circuit board and a neck portion for attachment of said housing to said feed through fitting and a rigid, essentially straight, coaxial connector arranged in said neck portion, said connector having a central lead portion without detachable connections, a first end of said lead portion protruding into the body portion, and a second end of said lead potion in electrical contact with the probe when the housing is attached to the feed through fitting, wherein the circuit board is mounted in direct contact with the first end of the lead portion, so that the essentially straight connector provides electrical contact between the probe and the transceiver circuitry.

According to this solution, one single connector extends between the feed through fitting and the circuit board, thus eliminating the need for a coaxial cable and its terminals. The phrase "detachable connections" refers to connections that are designed to be detachable, such as the connection between a terminal and a coaxial cable.

In free propagating radar level gauges it has been know to design the tank housing in such a way as to allow for an arrangement of the circuit board in direct connection with a hollow wave guide, extending through a tank seal to an antenna in the tank. However, due to the fundamental difference between guided waves and free propagating waves, this solution has not been considered to be useful in the case of guided waves. Instead, as mentioned above, a coaxial connection has been provided by a coaxial connector and a coaxial cable.

The present invention lies in the design of a rigid coaxial connector that can be used to bridge the distance between the feed through fitting and the circuit board, and allow mounting of the circuit board directly onto the connector.

The circuit board is preferably arranged in a plane perpendicular to the axial extension of the coaxial connector. This facilitates the connection between the circuit board and the connector.

According to one embodiment, the circuit board is provided with a hole, adapted to receive a tip of the lead portion, enabling electrical contact between said lead portion and conducting paths on a side of the circuit board opposite said connector. By receiving the tip in the hole, a secure and reliable connection is provided.

According to another embodiment, a tip of the lead portion is adapted to be brought into biased contact with a conducting path on a side of the circuit board facing said connector. Preferably, the tip is yieldingly arranged. Such a connection does not require guiding the tip into a hole, and thus facilitates mounting of the circuit board.

Another aspect of the invention relates to a coaxial connector for use is a guided wave radar level gauge having a probe with one end attached to a feed through fitting in the ceiling of a tank, the connector comprising a central lead portion, a first end of the lead portion being adapted to be secured in said feed though fitting in electrical contact with said probe, a second end of the lead portion being adapted to be brought into direct contact with a circuit board in said radar level gauge.

BRIEF DESCRIPTION OF THE DRAWINGS

This and other aspects of the present invention will now be described in more detail, with reference to the appended drawings showing a currently preferred embodiment of the invention.

FIG. 1 shows a sectional view of a radar level gauge according to prior art.

FIG. 2 shows schematically a radar level gauge according to a embodiment of the present invention arranged on a tank.

FIG. 4 shows a sectional view of an embodiment of the connector in FIG. 3.

FIG. 5 shows an exploded view of the connector in FIG. 4.

DETAILED DESCRIPTION OF PREFERRED EMBODIMENTS

Figure 3:
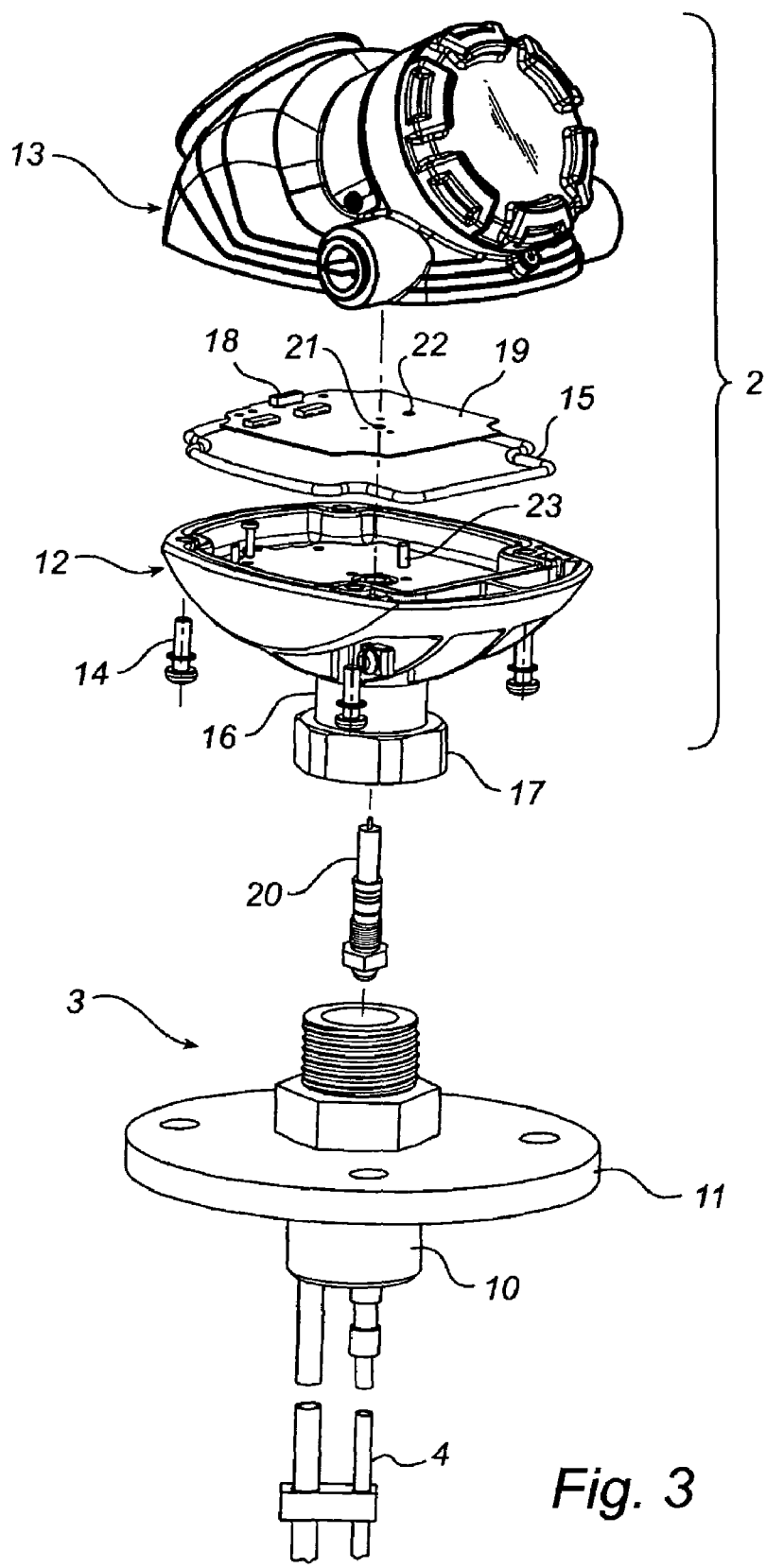
FIG. 3 shows an exploded view of the radar level gauge in FIG. 1.

FIG. 2 schematically shows a radar level gauge (RLG) system 1 according to an embodiment of the present invention. The RLG in FIG. 2 is referred to as a guided wave radar (GWR) system, and is typically suitable when the transmitted signals are unmodulated DC pulses, but can also be used for transmitting high frequency (micro wave) signals. The RLG comprises a housing 2, a tank connection 3, and a probe 4 attached to the tank connection and extending into the tank 5.

The probe can be a coaxial probe, a rigid or flexible twin probe, or a rigid or flexible single probe. A (twin or single) flexible probe is also referred to as a wire probe, while a (twin or single) rigid probe is also referred to as a rod probe. In some implementations, the probe can be replaced by a hollow wave guide, but this would require a transition between the hollow wave guide and a coaxial terminal in the tank connection. The probe may be provided with a coating, e.g. plastic, in order to protect the probe against corrosive tank content, or for hygiene reasons.

In particular in the case of a flexible probe, the lower end of the probe can be attached in the bottom of the tank, or attached to a weight that ensures that the end of the probe remains in the bottom of the tank.

The RLG 1 is arranged to determine a product level in the tank 5, i.e. the level L of an interface 6 between two (or more) materials 7, 8 in the tank 5. Typically, the first material 7 is a product stored in the tank, e.g. a liquid such as gasoline, while the second material 8 is air or some other atmosphere. In that case, the RLG will enable detection of the level of the surface 6 of the product 7 in the tank. Typically, only the level of a first liquid surface is measured, and/or a second liquid surface if the first liquid is sufficiently transparent.

In operation, the RLG transmits an electromagnetic signal, which is allowed to propagate along the probe 4 towards the surface 6. The signal is reflected by the surface, and the RLG determines the level L based on a relationship between the transmitted and received signals.

In the case of pulsed radar gauging, the signals can be DC pulses or pulses modulated on a carrier wave of a GHz frequency (microwaves). The pulses typically have a length of about 2 ns or less, with a pulse repetition frequency in the order of MHz, at average power levels in the mW or µW area.

In the case of Frequency Modulated Continuous Wave, FMCW, the signal can be a continuous signal with a frequency varying over a certain range (Frequency Modulated Continuous Wave, FMCW).

The various components of the RLG are shown in more detail in FIG. 3.

The upper end of the probe 4 is attached to a tank seal 10 which is sealingly secured in a flange 11 adapted to be fixedly arranged to the wall of the tank, typically in the upper part of the tank. The flange 11 and tank seal 10 form the tank connection 3. In case of stainless steel probe, the seal can be welded to the flange. For probes of other materials, the seal can be formed with a protective plate and a threaded fitting, and be secured by a nut, as indicated in FIG. 3. In any case, the probe is connected to the tank seal 10 so that electromagnetic signals can be transmitted through the seal 10 to and from the probe 4. The upper side of the tank seal is provided with a coaxial connection terminal (not shown), in electrical contact with the probe 4. An example of an electrical connection of a probe through a tank seal is disclosed in U.S. Pat. No. 6,148,681.

The RLG housing 2 comprises a lower part having a neck portion 16 and a body portion 12, and a cover 13 which is mounted on top of the lower part, here by means of screws 14. The cover 13 is preferably sealed by means of a rubber sealing 15. The body portion 12 is designed to accommodate the at least one circuit board 19, while the neck portion 16 is adapted for mounting the housing 2 on the tank connection 3, here by means of a threaded sleeve 17.

Inside the housing 2 is arranged various processing circuitry, notably transceiver circuitry 18 mounted on a circuit board 19. According this embodiment of the present invention, the circuit board is arranged essentially horizontally in the housing 2.

Further, a coaxial connector 20 is fitted inside the neck portion 16, adapted to transmit signals between the probe and the transceiver circuitry. The connector is shown in more detail in FIGS. 4 and 5.

The connector 20 includes an electrically conducting lead portion 31, which extends along the entire length of the connector, forming a tip 32 in the upper end of the connector. A dielectric portion 33a, 33b coaxially surrounds the lead portion 31 along essentially the entire length of the connector. In order to prevent axial displacement of the lead portion 31 with respect to the dielectric portion 33a, 33b, the lead portion is formed with a radially protruding girdle 38, and the dielectric portion comprises two separate pieces 33a and 33b, fitted one from each end of the lead portion 31 and formed to fixate the girder. One or several sealing members 34, e.g. o-rings, are arranged between the two pieces 33a, 33b, in order to protect the lead portion 31 from moisture and dirt.

In the illustrated example, the connector is further provided with a metal sleeve 35, arranged coaxially around the lower piece 33a of the dielectric portion. The sleeve portion 35 has a threaded portion 36 and a nut-shaped portion 37. The connector thus has a shape resembling a spark plug, and can be fitted in a similar way.

Returning to FIG. 3, the connector is rigidly fixed into the neck portion 16 of the housing 2, here by means of the threaded portion 36. The circuit board 19 is then arranged in the lower part 12 of the housing, in direct contact with the tip 32 of the connector 20. The circuit board is preferably secured by screws in proximity to the hole 21, in order to secure a satisfactory electrical contact. In the illustrated example, the circuit board 19 is provided with a hole 21 adapted to receive the upper tip of the connector, and enable electrical connection of the tip 32 with conducting paths on the upper side of the circuit board. The circuit board can further be provided with another hole 22, adapted to receive a guiding pin 23 in the lower part 12 of the housing, to ensure that the circuit board is guided into place without damaging the tip 32 of the connector 20.

The connection of the circuit board with the connector is facilitated if the circuit board is mounted in a plane essentially perpendicular to the axial extension of the connector. In the illustrated example, the connector is vertically arranged, while the circuit board is mounted horizontally.

The lower part 12 of the housing 2 can now be mounted on the tank connection 3, so that the lower end 39 of the lead 31 is brought into electrical contact with the connection in the tank seal 10.

Figure 6:
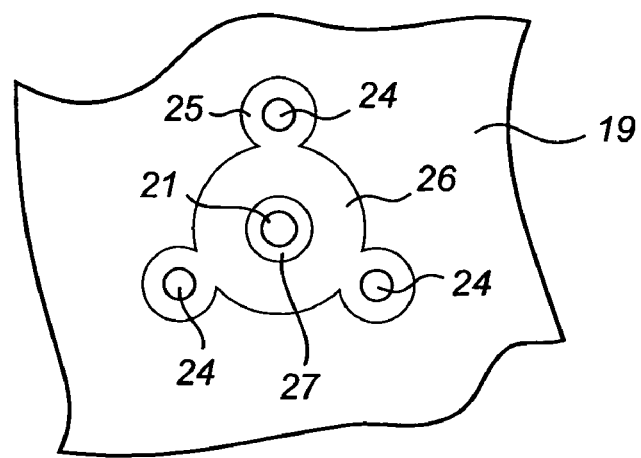
FIG. 6 is a bottom view of the circuit board in FIG. 3.

FIG. 6 shows the under side of the circuit board 19 in FIG. 3. As mentioned above, the circuit board is preferably secured by screws, and for this purpose has a number of screw holes 24. In a neighborhood 25 of these screw holes 24, the protective lacquer layer of the circuit board has been removed, so as to expose the ground layer of the circuit board. Similarly, in a neighborhood 26 around the hole 21, the protective lacquer layer has also been removed. This serves to ensure satisfactory electrical connection between the ground layer of the circuit board and the material in the hosing 2 to which the circuit board 19 is attached to. Preferably, these screw holes 24 are positioned symmetrically around the hole 21, in order to avoid unbalanced surface currents. In an area 27 immediately surrounding the hole 21, preferably within a radius essentially corresponding to the radius of the dielectric portion 33*a*, the ground layer of the circuit board has been removed (etched), so as to ensure electrical isolation of the tip 32 from the ground layer.

The electrical connection between the circuit board and the tip 32 of the connector 20 can be accomplished in various ways.

Figure 7A:
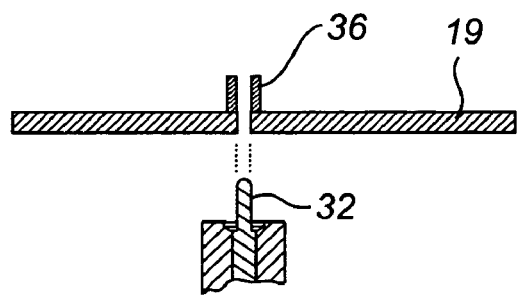
FIGS. 7a and 7b are two examples of how the connector in FIGS. 3 and 4 is connected to a circuit board.

In the case of connection to a conducting path on the upper side of the circuit board, the tip 32 is received by the hole 21. As shown in FIG. 7*a*, the circuit board can be provided with a sleeve fitting 41, adapted to snugly receive the tip 32 of the connector 20. The sleeve fitting 41 can be similar to the inner sleeve of a conventional coaxial cable connector, and is provided in electrical contact with the conducting paths on the upper side of the circuit board (not shown). Alternatively, the protruding part of the tip 32 is simply soldered to the conducting path of the circuit board when the circuit board is in place.

Figure 7B:
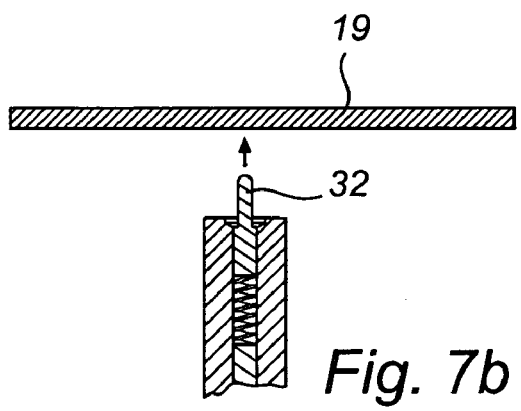

In the case of connection to a conducting path on the side facing the connector 20, the hole 21 may not be required. As shown in FIG. 7*b*, the tip 32 can then be yieldingly arranged in the connector, and adapted to be brought into biased contact with the conducting path of the circuit board. Alternatively, the circuit board 19 is simply secured firmly in place, pressing the conducting path against the tip 32.

The person skilled in the art realizes that the present invention by no means is limited to the preferred embodiments described above. On the contrary, many modifications and variations are possible within the scope of the appended claims. For example, the connector 20 may be connected to the circuit board in other ways. Further, the details of the connector design can be modified depending on the application.

What is claimed is:

1. A guided wave radar level gauge for determining a process variable of a product in a tank, comprising:
    a feed through fitting, adapted to be securely attached in the ceiling of the tank,
    a probe, having a first end fixedly arranged in said feed through fitting and a second end extending into the tank,
    transceiver circuitry mounted on a circuit board, said transceiver circuitry being arranged to generate an electromagnetic signal to be guided by the probe into the tank, and to receive a reflection of said signal guided back from the tank by the probe,
    processing circuitry connected to said transceiver circuitry and arranged to determine said process variable based on a relationship between said electromagnetic signal and said reflection,
    a housing having a body portion for accommodating said circuit board, and a neck portion for attachment of said housing to said feed through fitting,
    a rigid, essentially straight, coaxial connector arranged in said neck portion, said connector having a central lead portion without detachable connections, a first end of said lead portion protruding into said body portion, and a second end of said lead portion in electrical contact with said probe when said housing is attached to said feed through fitting,
    wherein said circuit board is mounted in a plane perpendicular to an axial extension of the coaxial connector, and in direct contact with said first end of said lead portion, so that said connector provides electrical contact between said probe and said transceiver circuitry.

2. The guided wave radar level gauge according to claim 1, wherein said probe is selected from the group comprising a coaxial probe, a flexible twin lead probe, a rigid twin lead probe, a flexible single lead probe and a rigid single lead probe.

3. The guided wave radar level gauge according to claim 1, wherein said fitting comprises a tank seal, sealing the interior of the tank.

4. The guided wave radar level gauge according to claim 3, wherein said tank seal is adapted to transmit electromagnetic signals between said probe and a terminal on the opposite side of the tank seal in relation to the probe, said connector being connected to said terminal.

5. The guided wave radar level gauge according to claim 1, wherein said connector includes a dielectric portion surrounding said lead portion along essentially the entire length of the connector, and a sleeve portion, surrounding said dielectric portion along at least a part of said connector.

6. The guided wave radar level gauge according to claim 5, wherein said lead portion has a radially protruding girder, and wherein said dielectric portion comprises two pieces, fitted from different ends of the lead portion and adapted to abut said girder, so as to prevent axial displacement of the lead portion with respect to the dielectric portion.

7. The guided wave radar level gauge according to claim 1, wherein said circuit board is provided with a hole, adapted to receive a tip of said lead portion, enabling electrical contact between said lead portion and conducting paths on a side of said circuit board opposite said connector.

8. The guided wave radar level gauge according to claim 1, wherein a tip of said lead portion adapted to be brought into contact with a conducting path on a side of said circuit board facing said connector.

9. The guided wave radar level gauge according to claim 7, wherein said tip is yieldingly arranged.

10. A coaxial connector for use is a guided wave radar level gauge having a probe with one end attached to a feed through fitting in the ceiling of a tank,
    said connector comprising
    a central lead portion,
        a first end of said lead portion being adapted to be brought into direct contact with a circuit board in said radar level gauge,
        a second end of said lead portion being adapted to be secured in said feed though fitting in electrical contact with said probe; and
    a dielectric portion surrounding said lead portion along essentially the entire length of the connector;
    wherein said lead portion has a radially protruding girder, and wherein said dielectric portion comprises two pieces, fitted from different ends of the lead portion and adapted to abut said girder, so as to prevent axial displacement of the lead portion with respect to the dielectric portion.

11. The coaxial connector in claim 9, further comprising a sleeve portion, surrounding said dielectric portion along at least a part of said connector.

* * * * *